United States Patent [19]
Reimer

[11] Patent Number: 5,609,462
[45] Date of Patent: Mar. 11, 1997

[54] BOAT LOADER AND CARRIER

[76] Inventor: Arnald E. Reimer, 833 Jordan Avenue, Nanaimo, British Columbia, Canada, V9R 4G9

[21] Appl. No.: 485,392

[22] Filed: Jun. 7, 1995

[51] Int. Cl.$^6$ .................................................. B60P 3/10
[52] U.S. Cl. ........................................ 414/462; 224/310
[58] Field of Search .................... 414/462, 494; 224/309, 310

[56] References Cited

U.S. PATENT DOCUMENTS

| | | | |
|---|---|---|---|
| 2,567,104 | 9/1951 | Di Fonzo | 414/462 |
| 3,048,291 | 8/1962 | Mabry | 414/462 |
| 3,128,893 | 4/1964 | Jones . | |
| 3,170,583 | 2/1965 | Meyer . | |
| 3,343,696 | 9/1967 | Morrison | 414/462 |
| 3,460,693 | 4/1969 | Oldham . | |
| 3,480,166 | 11/1969 | Abbott . | |
| 3,495,729 | 2/1970 | Kruse . | |
| 3,507,414 | 4/1970 | Souza | 414/462 |
| 3,648,866 | 3/1972 | Slown | 414/462 |
| 3,708,081 | 1/1973 | Schladenhauffen | 414/462 |
| 3,750,812 | 8/1973 | Evans . | |
| 3,777,922 | 12/1973 | Kirchmeyer | 414/462 |
| 3,819,074 | 6/1974 | Oliver | 414/462 |
| 3,871,540 | 3/1975 | Jenkins . | |
| 3,872,989 | 3/1975 | Smithson et al. . | |
| 3,877,594 | 4/1975 | Coakley . | |
| 3,885,689 | 5/1975 | Grove et al. . | |
| 3,894,643 | 7/1975 | Wilson | 414/462 |
| 3,905,499 | 9/1975 | Speidel | 414/462 |
| 3,915,323 | 10/1975 | Underhill | 414/462 |
| 3,924,764 | 12/1975 | Youngblood, Jr. . | |
| 3,927,779 | 12/1975 | Johnson . | |
| 3,972,433 | 8/1976 | Reed . | |
| 4,024,971 | 5/1977 | Rohrer | 414/462 |
| 4,034,879 | 7/1977 | Cudmore | 414/462 |
| 4,087,014 | 5/1978 | Schadle . | |
| 4,234,285 | 11/1980 | Martinez . | |
| 4,239,438 | 12/1980 | Everson | 414/462 |
| 4,269,561 | 5/1981 | Rutten | 414/462 |
| 4,274,788 | 6/1981 | Sutton . | |
| 4,439,086 | 3/1984 | Thede . | |
| 4,531,879 | 7/1985 | Horowitz . | |
| 4,907,934 | 3/1990 | Holladay | 414/462 |
| 4,953,757 | 9/1990 | Stevens et al. . | |
| 5,071,308 | 12/1991 | Tibbet . | |

*Primary Examiner*—David A. Bucci
*Assistant Examiner*—Douglas Hess
*Attorney, Agent, or Firm*—Robert H. Barrigar; Barrigar & Moss

[57] ABSTRACT

A boat loader and carrier for mounting on a motor vehicle such as a pick-up truck, comprising an upper frame for supporting the boat, having forward and rearward ends and transversely spaced legs whose proximate ends are attached to the upper frame, said legs extending downwardly from the transversely spaced side edges of the rearward end of the frame, the distal ends of the legs pivotally attachable to a lower frame clamped to the pick-up truck so as to allow the upper frame to pivot about the pivotal axes between a generally horizontal carrying position above and substantially parallel with the roof of the pick-up and a loading/unloading position inclined downwardly rearwardly relative to the carrying position; a winch fixed in position forwardly relative to the pivotal axes of the legs when the loader and carrier is mounted on the vehicle, for pulling the boat onto the upper frame and for allowing the boat to be controllably lowered off the upper frame; and a cable connecting the upper and lower frames for limiting the maximum inclination of the upper frame.

15 Claims, 5 Drawing Sheets

BOAT LOADER AND CARRIER

BACKGROUND OF THE INVENTION

1. Field of the Invention

This invention relates generally to devices for loading and carrying a boat or similar object on top of a motor vehicle.

2. Description of the Prior Art

A common way to transport a small boat is by means of a trailer. This presents several disadvantages as compared to carrying a boat on the top of a motor vehicle. First, use of a trailer limits the speed and maneuverability of the motor vehicle. Second, the trailer must be purchased, stored, and maintained at considerable expense. Third, a motor vehicle cannot pull a boat trailer and a travel trailer at the same time. Hence, there is a need in the art for devices to transport boats on top of motor vehicles. Further, devices are needed for loading and carrying boats that are designed for or easily adaptable for use with pick-up trucks, a type of motor vehicle commonly used by fishermen, who also need easy means for transporting small boats, preferably with the motor attached.

There are a wide variety of prior devices for transporting boats on top of motor vehicles. Many such devices transport the boat upside down. This has the disadvantage of requiring removal of the outboard motor during transport as well as requiring additional mechanical means or assistance for turning the boat over when loading or unloading. Examples of such devices are Kruse, U.S. Pat. No. 3,495,729, Evans, U.S. Pat. No. 3,750,812, Jenkins, U.S. Pat. No. 3,871,540, Grove et al., U.S. Pat. No. 3,885,689, Youngblood, Jr., U.S. Pat. No. 3,924,764, Schadle, U.S. Pat. No. 4,087,014, Thede, U.S. Pat. No. 4,439,086, Stevens et al., U.S. Pat. No. 4,953,757, and Tibbet, U.S. Pat. No. 5,071,308.

Prior devices that are designed for or adaptable for use on a pick-up truck typically prevent or restrict the use of the cargo bed for other purposes, interfere with the simultaneous use of a canopy over the cargo bed, or involve complex, expensive, and heavy telescoping rails or other mechanisms or modification of the bumpers or other parts of the pick-up truck to allow attachment of the device. For example, Sutton, U.S. Pat. No. 4,274,788, Reed, U.S. Pat. No. 3,972,433, and Smithson, U.S. Pat. No. 3,872,989 each disclose boat carrying and loading devices specifically designed for pick-up trucks, but each requires permanent installation in the cargo bed of the truck, preventing the use of a canopy or the most of the space occupied by a canopy for other purposes. In effect, the pick-up truck's carrying ability is dedicated to a single purpose.

There are some prior devices that, while designed for conventional automobiles or vans, could be adapted for use on a pick-up truck, possibly allowing a canopy to be used concurrently. In each case, these devices utilize expedients such as sliding frames or telescoping rails, as well as requiring modifications to the motor vehicle to provide attachment points. Examples are Meyer, U.S. Pat. No. 3,170,583, Jones, U.S. Pat. No. 3,128,893, Coakley, U.S. Pat. No. 3,877,594, Martinez, U.S. Pat. No. 4,234,285, and Johnson, U.S. Pat. No. 3,927,779.

There are also prior devices that could be used on a pick-up truck, but would not allow use of a canopy. For example, Oldham, U.S. Pat. No. 3,460,693 and Horowitz, U.S. Pat. No. 4,531,879. Oldham uses an extending beam that would impinge on the location of a canopy on a pick-up truck. Horowitz does not use a beam or other extending member, but would not allow the use of a canopy on a pick-up truck as the boat and the framework carrying it tilt into the location a canopy would occupy.

Suitable apparatus easy to use and economical to manufacture for carrying and loading small boats upright with an outboard motor attached, that are mountable on a pick-up truck without modification to the pick up truck, that permit the bed of the truck to be used to carry other cargo, that permit a trailer to be towed, and that allow the simultaneous use of a canopy over the cargo bed of the truck, were not known prior to the present invention.

SUMMARY OF THE INVENTION

The invention is an improved boat carrier and loader for pick-up trucks having the advantage over the prior art of being suitable for carrying a boat in an upright position with the motor attached without requiring removal of a modestly-sized canopy attached to the cargo box of the pick-up truck.

In its most general aspect, the present invention comprises (1) a frame for supporting a boat with retractable wheels in an upright horizontal carrying position above a motor vehicle, (2) means for pivoting the frame about a horizontal axis transverse to the longitudinal axis of the pickup and displaced below one end of the frame so as to incline the frame into a loading/unloading position inclined downwardly toward the end of the frame above the horizontal axis, and (3) a winch for attachment to a cable for pulling the boat onto the frame and allowing the boat to be controllably lowered off the frame. The means for pivoting the frame may comprise legs or other structural members rigidly attached to the frame and pivotably attached either directly to the motor vehicle or indirectly to a second frame or other structure rigidly attached to the motor vehicle.

The preferred embodiment of the present invention uses two frames. The lower frame comprising two plates clampable onto the edges of the cargo box of a pick-up truck and a tube connecting the front ends of the plates and passing over the front of the cargo box so as not to impinge on any canopy (of modest size) that may be mounted on the cargo box. The lower frame provides the rear two brackets serving as pivot points for connection to an upper frame and at the front an attachment point for a cable whose function is to restrict the inclination of the upper frame. The upper frame resembles the frame of a boat trailer, with two rigidly attached legs at the rear end instead of an axle and wheels. The legs extend downward and are pivotally attached to the lower frame at the latter's rear pivot point brackets. At the front of the upper frame is a winch, preferably electric, for pulling the boat onto the upper frame and for controlling the boat as it is lowered off the upper frame. The upper and lower frames are connected together at the front by the cable to restrict the tilting of the upper frame. The cable is spring loaded so as to retract as the upper frame is lowered into a horizontal position.

By pivoting about an axis substantially lower than the level at which the boat is carried, the upper frame becomes inclined and the end of the upper frame nearest the pivotal axis is lowered somewhat at the beginning of the boat loading procedure. As loading continues the boat comes in contact with rollers on the upper frame and, together with retractable wheels mounted on the boat, the boat is securely supported as it is pulled by the winch up onto the upper frame. The boat's retractable wheels do not leave the ground until the boat is far enough onto the upper frame to be in contact with a sufficient number of the rollers to be securedly supported while being moved into its final position for carriage. Similarly, as the boat is unloaded, the upper frame tilts so that the rollers control the boat until the wheels touch the ground. The moving frames or extending beams used in the prior art are not needed to control and support the boat as it is loaded or unloaded.

DETAILED DESCRIPTION OF THE INVENTION

Figure 1:
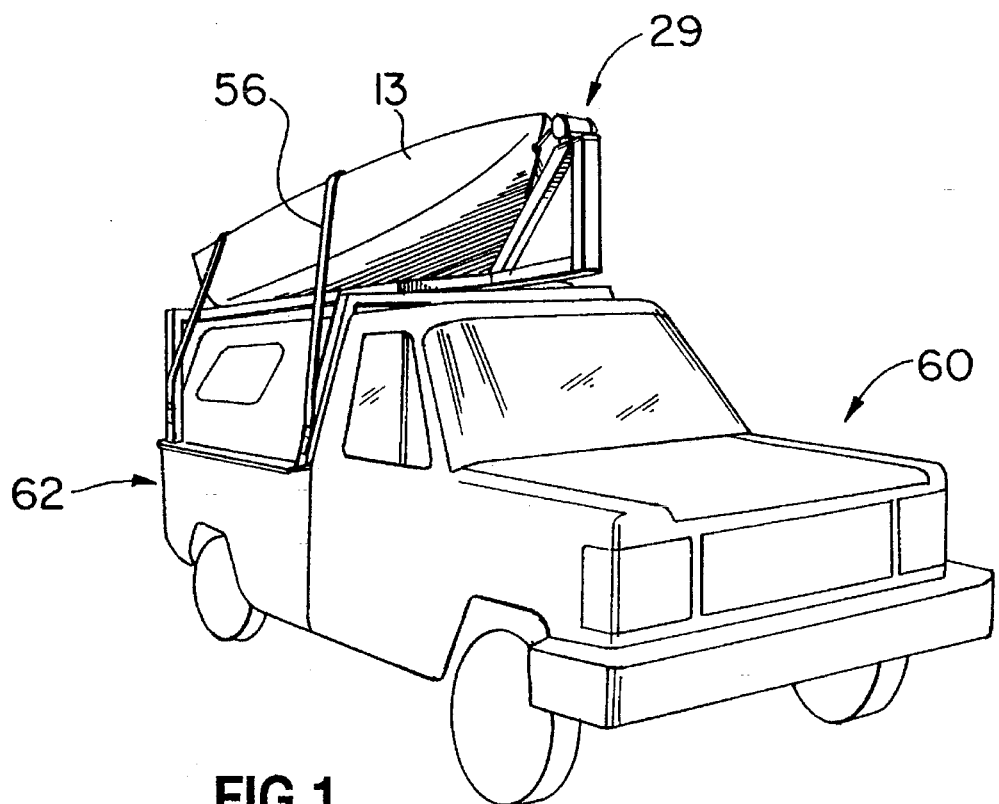
FIG. 1 is a perspective view showing the device with the boat in carrying position on top of the pickup truck.
Figure 2:
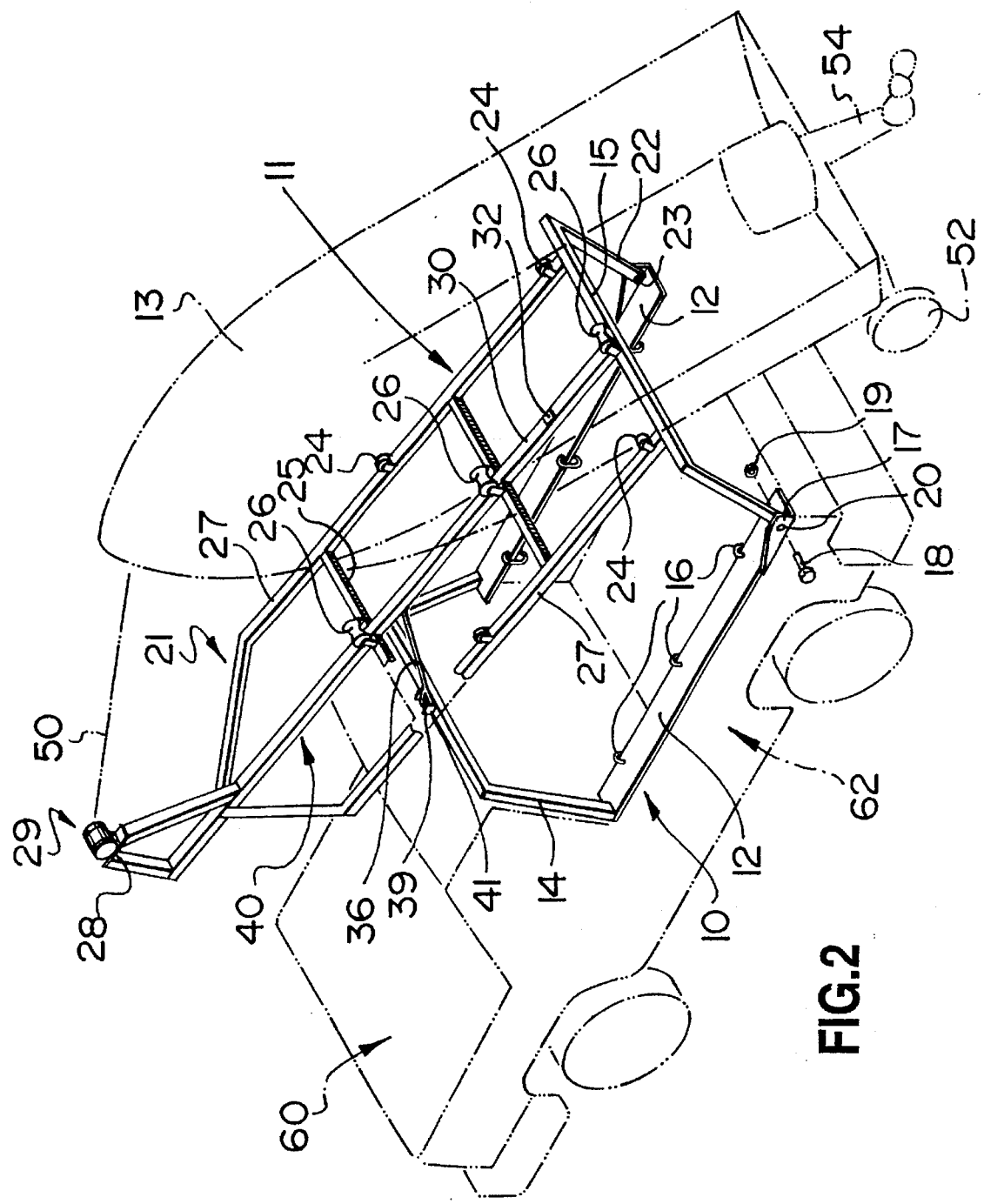
FIG. 2 is an isometric view showing the device in operative attitude for unloading or loading.

A preferred embodiment of the subject invention is shown in perspective view in carrying position in FIG. 1 and in operative attitude for loading or unloading in FIG. 2. In the preferred embodiment shown in FIGS. 1 and 2, the boat carrier 11 subject invention comprises two frames, an upper frame 21 and a lower frame 10. The lower frame 10 is comprised of two lower frame side plates 12 suitable for being clamped using clamps 16 onto the edges of the cargo box 62 of a pickup truck 60, a lower frame arch 14 connecting the front ends of the lower frame side plates 12, and vertical fixed hinge plates, flanges or brackets 17 welded to, or formed in or otherwise fixed to the rear ends of the lower frame side plates 12. Each fixed hinge plate 17 is provided with a hole 20, a bolt 18 passing through the hole 20, and a nut 19 screwed onto bolt 20. Each bolt 18 provides an axis rotation of an upper frame 21. Alternatively, a securable pin could be substituted for bolt 18.

The lower frame arch 14 passes over the front of the cargo box 62 so as not to impinge on any canopy of modest size that may be mounted on the cargo box 62. The lower frame arch 14 provides a location to secure a cable 36 whose function is to restrict the inclination of the upper frame 21. One end of the cable 36 ends in a snap hook 39. To secure the cable 36 to the lower frame arch 14, the end of the cable 36 with the snap hook 39 is passed around the lower frame arch 14 and snapped onto the cable 36 itself.

The upper frame 21 resembles the frame of a boat trailer without an axle and wheels and comprises a central beam 30, two side beams 27, cross members 25 connecting the central beam 30 and the side beams 27, a cross piece 15 with two legs 22 at the rear end of the upper frame 21, and a winch mounting plate 28 at the front end of the upper frame 21. The legs 22 extend downward and are pivotally attached to the lower frame 12 by means of bolts 18 and nuts 19. A remotely controlled electric winch 29 of conventional design is mounted upon the winch mounting plate 28 and is attached to a winch cable 50 for pulling the boat 13 onto the upper frame 21 and for controlling the boat 13 as it is lowered off the upper frame 21.

To prevent movement of the upper frame 21 in relation to the lower frame 10 should an accident occur during transit, the upper frame 21 has a safety tab 40 attached to the lower side of the center beam and the lower frame 10 has two safety tabs 41 attached to either side of the center of the lower frame arch 14. Safety tab 40 is positioned so that when the upper frame is in carrying position the safety tab 40 is behind the lower frame arch 14 so that in a sudden stop the safety tab 40 will press against the lower frame arch 14 and restrict the forward movement of the upper frame 21. Similarly, the safety tabs 41, when the upper frame is in carrying positions are on either side of the center beam 30 of the upper frame 21, thereby restricting side to side movement of the upper frame 21.

Figure 3:
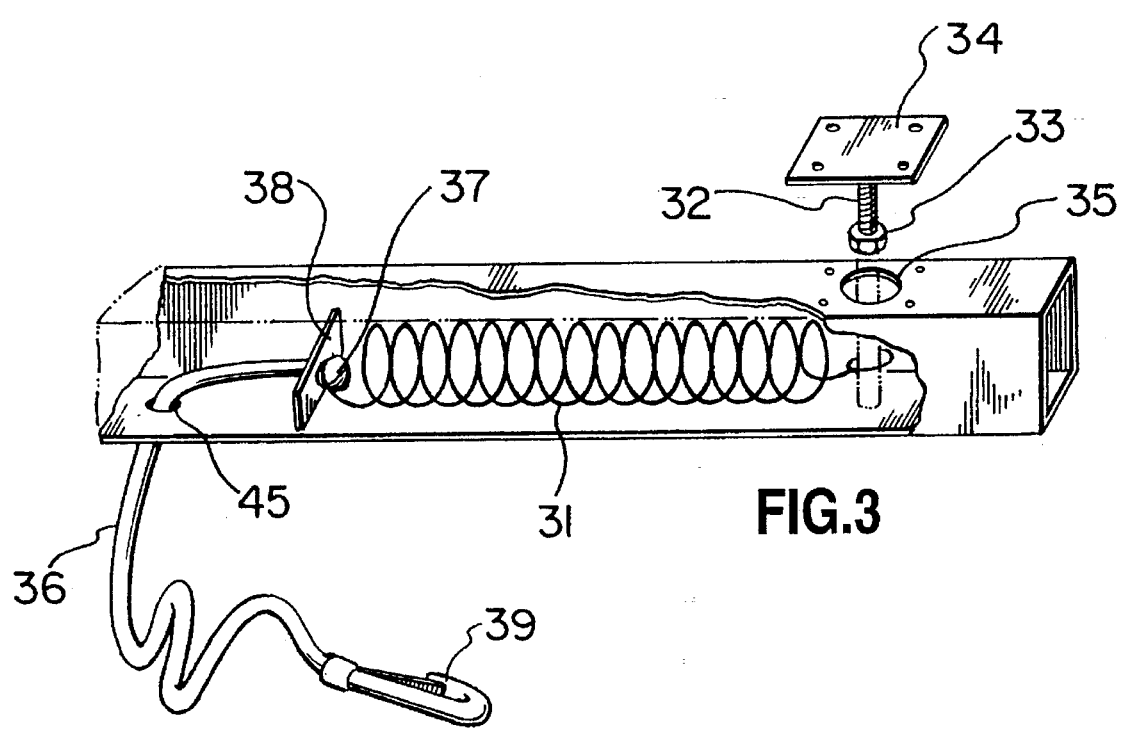
FIG. 3 is an isometric view partially cutaway of the spring mechanism inside the center beam of the upper frame.

The upper frame 21 and the lower frame 10 are connected together at the front by a cable 36 to restrict the tilting of the upper frame 21. One end of the cable 36 ends in a snap hook 39. To secure the cable 36 to the lower frame arch 14, the end of the cable 36 with the snap hook 39 is passed around the lower frame arch 14 and snapped onto the cable 36 itself. The cable 36 is spring loaded so as to retract into the center beam 30 of upper frame 21 as the upper frame 21 is lowered into a horizontal position. FIG. 3 illustrates the retraction mechanism. Cable 36 passes through a hole 45 in the underside of center beam 30, passes through a ball stop plate 38, and connects to a spring 31. A ball 37 is secured to the cable 36 near the connection of the spring 31 to the cable 36 on the portion of the cable 36 between the ball stop plate and the connection to the spring 31. The end of the spring 31 not connected to the cable 36 is attached to a bolt 32 and held by a nut 33. The bolt 32 in turn is screwed into an access and attachment plate 34, which covers an access opening 35 in the center beam 30.

To each side beam 27 are attached two outside rollers 24. In each case one outside roller 24 is attached to the side beam 27 near the rear end of the side beam 27 and one outside roller 24 is attached at about the middle of the side beam 27. Two center rollers 26 are attached to the center beam 30 approximately ⅓ of the way in from each end of the center beam 30. A third center roller 26 is attached to the cross piece 15 at its center.

The unloading of a typical boat 13 from the described boat carrier 11 mounted on a typical pickup truck 60 is illustrated step by step in FIGS. 4 through 12. Loading of a boat 13 onto the boat carrier 11 is simply the reverse of this process.

Figure 4:
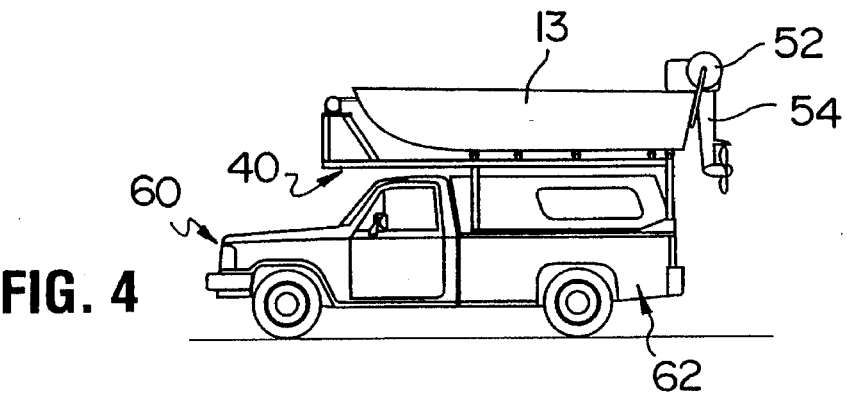
FIG. 4 is a side elevation schematic view showing the boat on the top of the pickup truck in carrying position.

In FIG. 4, a boat 13 is shown in carrying position tied down to the boat carrier 11 with a tie-down strap 56. The boat 13 is shown with retractable wheels 52 and an outboard motor 54. The tie-down strap 56, the retractable wheels 52, and the outboard motor 54 are conventional and not part of this invention. The boat 13 rests on the center rollers 26 and the outside rollers 24, with the bow of boat 13 pulled against the winch mounting plate 28 by the winch 29.

Figure 5:
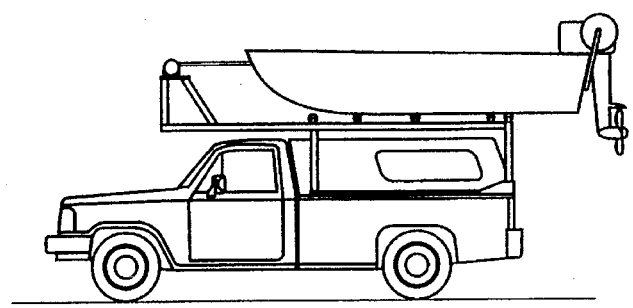
FIG. 5 is a side elevation schematic view showing the boat being rolled back on the device at the beginning of the unloading process.

In FIG. 5 the tie-down strap 56 has been removed, the winch cable 50 from the winch 29 has been released, and the boat 13 rolled back manually on the center rollers 26 and the outside rollers 24 to a position just before the boat 13 will begin to tilt up on the rearmost of the center rollers 26 and outside rollers 24.

Figure 6:
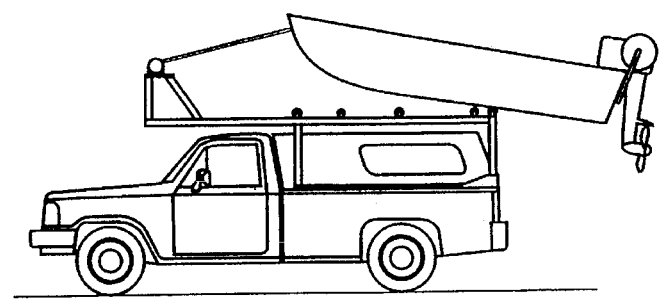
FIG. 6 is a side elevation schematic view showing the boat beginning to tilt as it rolls backward.

In FIG. 6 the boat 13 has begun to tilt, while the upper frame 21 has not begun to tilt. Further unloading is carried out by controllably letting out the winch cable 50 from the winch 29. The winch 29 is now resisting the tendency of the boat 13 to roll off the back of the upper frame 21 under the influence of gravity.

Figure 7:
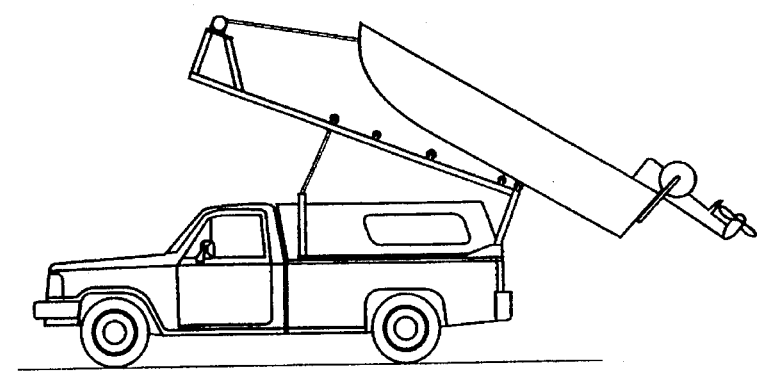
FIG. 7 is a side elevation schematic view showing the upper frame beginning to tilt as boat rolls further backward.

As the boat is allowed to roll further back, the weight of the boat 13 on the rear end of the upper frame 21 causes the upper frame 21 to tilt. The result of this is illustrated in FIG. 7, which shows the maximum tilt of the upper frame 21. The cable 36 extending from the upper frame 21 to the lower frame arch 14 has restricted the maximum angle of inclination of the upper frame 21 to the horizontal.

Figure 8:
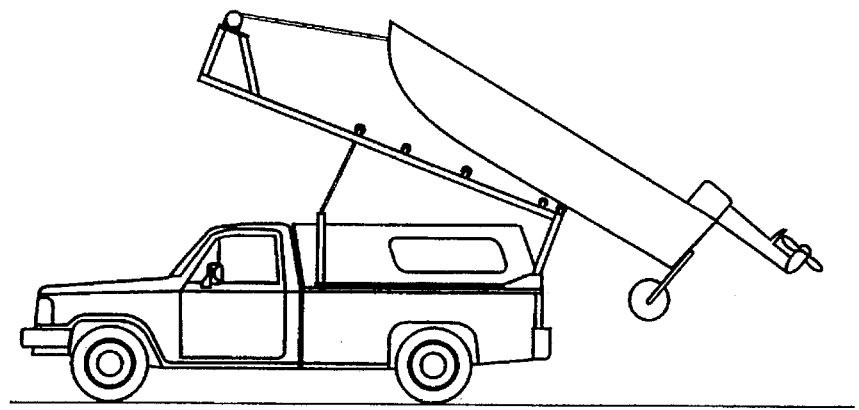
FIG. 8 is a side elevation schematic view showing the upper frame tilted after the boat has rolled further backward and after wheels have been lowered and motor tilted up.

In FIG. 8 the wheels 52 have been lowered and the motor tilted back. The boat 13 is supported by the rearmost of the rollers 24,26 and prevented from rolling off the upper frame 21 by the pull of the winch cable 50.

Figure 9:
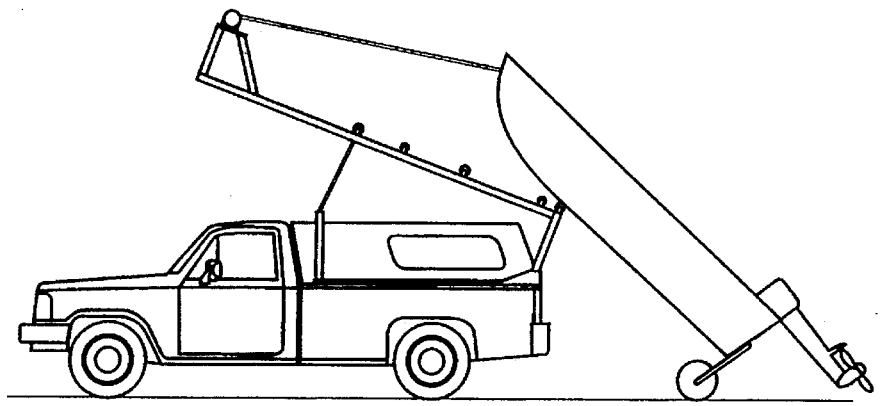
FIG. 9 is a side elevation schematic view showing boat lowered to ground.
Figure 10:
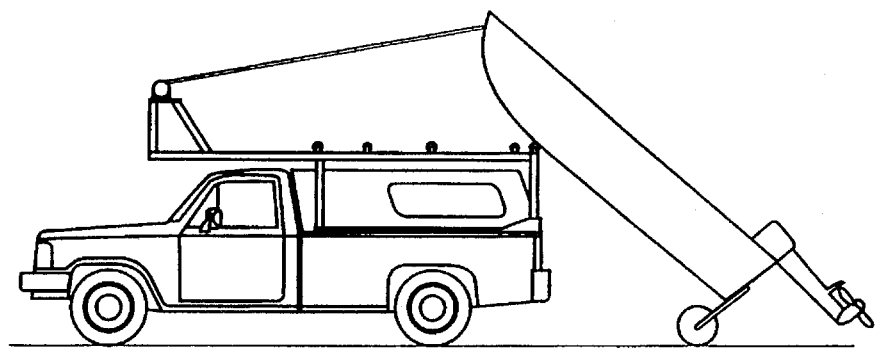
FIG. 10 is a side elevation schematic view showing upper frame tilted back-into lowered position.
Figure 11:
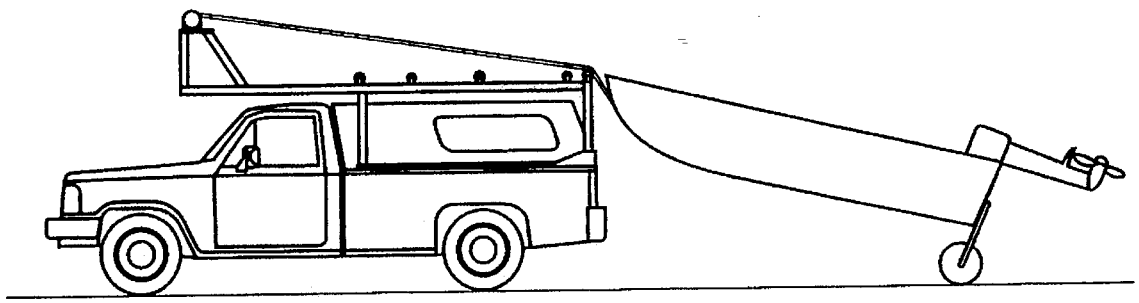
FIG. 11 is a side elevation schematic view showing the boat almost to the ground.
Figure 12:
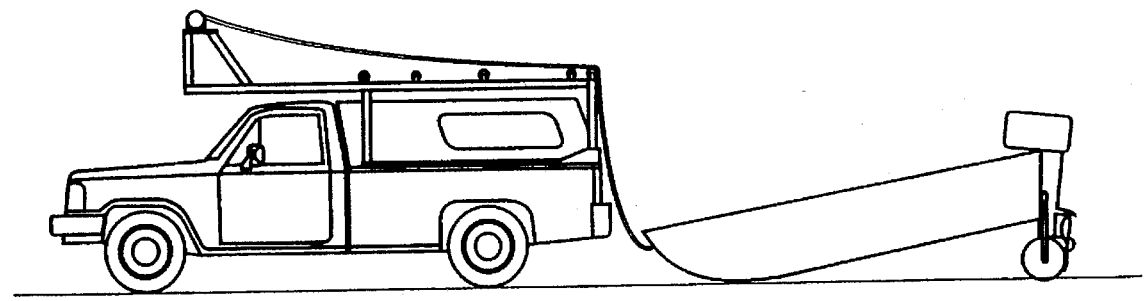
FIG. 12 is a side elevation schematic view showing the boat on the ground ready to be rolled into the water.

In FIG. 9 the boat 13 has been lowered further by letting more winch cable 50 out of the winch 29 so that the wheels 52 touch the ground. As further winch cable 50 is released from the winch 29, the upper frame 21 lowers back into carrying position as illustrated in FIG. 10. As still further winch cable 50 is released from the winch 29, the boat 13 is lowered to the ground as illustrated in FIGS. 11 and 12.

The boat carrier of the present invention does without the moving frames or extending beams found in the prior art by using a tilting upper frame that is tilted and concurrently lowered closer to the ground for loading and unloading. This is accomplished by having the legs 22 pivot about an axis substantially below the level at which the boat 13 is carried. The boat 13 is not put into the precarious position that would result if it were supported only by one center roller while being lowered to the ground by the winch cable 50 from the winch 29. Instead the boat 13 maintains contact with the rearmost of the outside rollers 24 and the rearmost of the center rollers 26 until the retractable wheels 52 at the rear of the boat 13 reach the ground. This would not be the case with a typical boat hull if the upper frame did not lower as it tilts (as would be the case if there were no legs 22 and the axis about which the upper frame tilts were at the same level as the carrying position). Previously known boat carriers avoid a similar precarious position by using extendable beams or moveable frames to support or guide the boat out of or into the carrying position. These means are heavy and complicated compared to the simple structure of the present invention.

Variants of what has been described or illustrated will occur to those skilled in carrier design and the like. The invention is not to be limited by the description of the preferred embodiments; its scope is as defined in the accompanying claims.

What is claimed is:

1. A boat loader and carrier for mounting on a motor vehicle, comprising:

(a) an upper frame for supporting a boat having a bottom;

(b) means for pivoting the upper frame about a horizontal transverse axis located below a selected end of the upper frame to allow the upper frame to pivot between a generally horizontal carrying position above and generally parallel to the ground and a loading/unloading position inclined downwardly at an angle of inclination to the horizontal carrying position and toward the selected end of the upper frame; and (c) a winch for attachment to a cable for pulling the boat onto the upper frame and for allowing the boat to be controllably lowered off the upper frame, so that when the boat loader and carrier is mounted on a motor vehicle, the upper frame can pivot only about the horizontal transverse axis.

2. A boat loader and carrier as defined in claim 1, wherein the winch is fixed to a selected end of the upper frame.

3. A boat loader and carrier as defined in claim 2, additionally comprising means attached to the upper frame and attachable to the vehicle for limiting the angle of inclination of the upper frame to the horizontal during loading and unloading of the boat.

4. A boat loader and carrier as defined in claim 3, additionally comprising means for reducing friction between the upper frame and the boat during loading and unloading of the boat and for centering the boat on the upper frame.

5. A boat loader and carrier as defined in claim 4, wherein the means for reducing friction between the upper frame and the boat during loading and unloading of the boat and for centering the boat on the upper frame comprises a multiplicity of rollers pivotally mounted on the upper frame and conformable to the bottom of the boat.

6. A boat loader and carrier for mounting on a motor vehicle having an uppermost surface, comprising:

(a) an upper frame for supporting in a predominantly upright position a boat having a bottom, the upper frame having transversely spaced substantially downwardly extending legs whose proximate ends re rigidly attached to the upper frame substantially near a selected end of the upper frame and whose distal ends are pivotally attachable to mounts fixed to the vehicle so as to allow the upper frame to pivot about pivotal axes intersecting the mounts, between a generally horizontal carrying position above and substantially parallel to the uppermost surface of the vehicle and a loading/unloading position inclined downwardly toward the selected end of the upper frame at an angle of inclination to the carrying position of less than approximately 45 degrees; and (b) a winch for attachment to a cable for pulling the boat onto the upper frame and for allowing the boat to be controllably lowered off the upper frame, whereby the boat is maintained in a predominantly upright position while being carried and during loading and unloading.

7. A boat loader and carrier as defined in claim 6, wherein the winch is fixed to a selected end of the upper frame.

8. A boat loader and carrier as defined in claim 7, additionally comprising means attached to the upper frame and attachable to the vehicle for limiting the angle of inclination of the upper frame to the horizontal during loading and unloading of the boat to less than approximately 45 degrees.

9. A boat loader and carrier as defined in claim 8, additionally comprising means for reducing friction between the frame and the boat during loading and unloading of the boat and for centering the boat on the frame.

10. A boat loader and carrier as defined in claim 9, wherein the means for reducing friction between the frame and the boat during loading and unloading of the boat and for centering the boat on the frame comprises a multiplicity of rollers pivotally mounted on the upper frame and conformable to the bottom of the boat.

11. A boat loader and carrier as defined in claim 6 for use with a pick-up truck having a cargo bed, wherein the legs are transversely spaced by approximately the width of the cargo bed of the pick-up truck.

12. A boat loader and carrier for mounting on a pick-up truck having a cargo bed with sides, comprising:
 (a) a lower frame clampable to the sides of the cargo bed of the pick-up truck and having forward and rearward ends;
 (b) an upper frame for supporting a boat in a predominantly upright position, the upper frame having a rear end and two transversely spaced substantially downwardly extending legs whose proximate ends are rigidly attached to the upper frame substantially near the rear end of the upper frame and whose distal ends are pivotally attached to the rearward ends of the lower frame so as to allow the upper frame to pivot between a generally horizontal carrying position above and substantially parallel to the uppermost surface of the pick-up truck and a loading/unloading position inclined downwardly toward the selected end of the upper frame at an angle of inclination to the carrying position of less than approximately 45 degrees; and
 (c) a winch fixed to the forward end of the upper frame for attachment to a cable for pulling the boat onto the upper frame and for allowing the boat to be controllably lowered off the upper frame,
whereby the boat is maintained in a predominantly upright position while being carried and during loading and unloading.

13. A boat loader and carrier as defined in claim 12, additionally comprising means attached to the upper frame and attachable to the vehicle for limiting the angle of inclination of the upper frame to the horizontal during loading and unloading of the boat to less than approximately 45 degrees.

14. A boat loader and carrier as defined in claim 13, additionally comprising means for reducing friction between the upper frame and the boat during loading and unloading of the boat and for centering the boat on the upper frame.

15. A boat loader and carrier as defined in claim 14, wherein the means for reducing friction between the upper frame and the boat during loading and unloading of the boat and for centering the boat on the upper frame comprises a multiplicity of rollers pivotally mounted on the upper frame and conformable to the bottom of the boat.

* * * * *